(12) United States Patent
Narasimhan et al.

(10) Patent No.: US 11,350,114 B2
(45) Date of Patent: *May 31, 2022

(54) SIGNALING FOR ADDITION OR REMOVAL OF LAYERS IN VIDEO CODING

(71) Applicant: ARRIS Enterprises LLC, Suwanee, GA (US)

(72) Inventors: Mandayam A. Narasimhan, San Diego, CA (US); Ajay K. Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,224

(22) Filed: May 6, 2020

(65) Prior Publication Data
US 2020/0267398 A1    Aug. 20, 2020

Related U.S. Application Data

(63) Continuation of application No. 16/038,470, filed on Jul. 18, 2018, now Pat. No. 10,681,359, which is a
(Continued)

(51) Int. Cl.
*H04N 19/30*    (2014.01)
*H04N 19/152*    (2014.01)
(Continued)

(52) U.S. Cl.
CPC .......... *H04N 19/30* (2014.11); *H04N 19/152* (2014.11); *H04N 19/46* (2014.11); *H04N 19/70* (2014.11)

(58) Field of Classification Search
CPC ... H04N 19/70; H04N 19/30; H04N 19/00418
See application file for complete search history.

(56) References Cited

U.S. PATENT DOCUMENTS 5,818,531 A     10/1998  Yamaguchi
6,501,797 B1 *  12/2002  van der Schaar ...... H04N 19/37
                                                      375/240.12
(Continued)

FOREIGN PATENT DOCUMENTS

WO    2008/084184 A2    7/2008
WO    2008/085433 A2    7/2008
(Continued)

OTHER PUBLICATIONS

PCT Search Report & Written Opinion, RE: Application #PCT/US2014/033231; dated Jul. 4, 2014.
(Continued)

*Primary Examiner* — Tsion B Owens
(74) *Attorney, Agent, or Firm* — Chernoff, Vilhauer, McClung & Stenzel, LLP

(57) ABSTRACT

In one embodiment, a method determines an encoded plurality of layers for a scalable video stream for a video where each of the plurality of layers includes a respective layer parameter setting. An additional layer for the plurality of layers is determined where the additional layer enhances a base layer in the plurality of layers and the respective layer parameter settings for the encoded plurality of layers do not take into account the additional layer. The method then determines an additional layer parameter setting for the additional layer. The additional layer parameter setting specifies a relationship between the additional layer and at least a portion of the plurality of layers where the additional layer parameter setting is used to decode the additional layer and the at least a portion of the plurality of layers.

20 Claims, 6 Drawing Sheets

Related U.S. Application Data continuation of application No. 14/246,699, filed on Apr. 7, 2014, now Pat. No. 10,063,868.

(60) Provisional application No. 61/809,741, filed on Apr. 8, 2013.

(51) Int. Cl.
*H04N 19/70* (2014.01)
*H04N 19/46* (2014.01)

(56) References Cited

U.S. PATENT DOCUMENTS

| | | | |
|---|---|---|---|
| 8,233,532 B2* | 7/2012 | Wiegand | H04L 1/0009 375/240.02 |
| 8,705,624 B2* | 4/2014 | Gupta | H04N 19/31 375/240.12 |
| 9,282,343 B2* | 3/2016 | Leontaris | H04N 19/63 |
| 9,325,997 B2 | 4/2016 | Deshpande | |
| 9,326,005 B2 | 4/2016 | Terada | |
| 2005/0254575 A1 | 11/2005 | Hannuksela et al. | |
| 2007/0091919 A1 | 4/2007 | Sandoval | |
| 2007/0160126 A1 | 7/2007 | Van Der Meer | |
| 2007/0230564 A1 | 10/2007 | Chen | |
| 2007/0291837 A1 | 12/2007 | Eleftheriadis | |
| 2008/0043832 A1* | 2/2008 | Barkley | H04N 21/234381 375/240 |
| 2008/0159384 A1 | 7/2008 | Civanlar | |
| 2009/0225870 A1 | 9/2009 | Narasimhan | |
| 2011/0002397 A1 | 1/2011 | Wang | |
| 2011/0012994 A1 | 1/2011 | Park | |
| 2011/0032999 A1 | 2/2011 | Chen et al. | |
| 2011/0110436 A1 | 5/2011 | Schierl | |
| 2011/0274180 A1 | 11/2011 | Lee | |
| 2012/0230401 A1 | 9/2012 | Chen | |
| 2012/0230431 A1 | 9/2012 | Boyce et al. | |
| 2012/0230432 A1 | 9/2012 | Boyce et al. | |
| 2013/0010863 A1 | 1/2013 | Wu | |
| 2013/0114680 A1 | 5/2013 | Leontaris | |
| 2013/0128990 A1 | 5/2013 | Narasimhan | |
| 2013/0266077 A1 | 10/2013 | Boyce | |
| 2014/0010291 A1* | 1/2014 | He | H04N 19/70 375/240.12 |
| 2014/0023138 A1 | 1/2014 | Chen | |
| 2014/0093179 A1 | 4/2014 | Deshpande | |
| 2014/0115100 A1 | 4/2014 | Changuel | |
| 2014/0181885 A1* | 6/2014 | Rusert | H04N 19/70 725/131 |
| 2014/0301476 A1* | 10/2014 | Deshpande | H04N 19/44 375/240.25 |
| 2014/0301482 A1 | 10/2014 | Narasimhan | |
| 2014/0348232 A1* | 11/2014 | Leontaris | H04N 19/186 375/240.12 |
| 2015/0016547 A1 | 1/2015 | Tabatabai et al. | |
| 2015/0195532 A1 | 7/2015 | Nakagami | |
| 2015/0229966 A1 | 8/2015 | Choe | |
| 2015/0256838 A1 | 9/2015 | Deshpande | |
| 2015/0341644 A1 | 11/2015 | Narasimhan | |
| 2015/0341645 A1* | 11/2015 | Narasimhan | H04N 19/187 375/240.02 |
| 2015/0341649 A1 | 11/2015 | Narasimhan | |
| 2016/0044324 A1 | 2/2016 | Deshpande | |
| 2016/0065980 A1* | 3/2016 | Choi | H04N 19/172 375/240.25 |
| 2016/0156914 A1 | 6/2016 | Suehring | |

FOREIGN PATENT DOCUMENTS

| | | |
|---|---|---|
| WO | 2014/168890 A1 | 10/2014 |
| WO | 2014/168893 A1 | 10/2014 |

OTHER PUBLICATIONS

Anonymous, "Text ISO/IEC 13818-1:2007/FPDAM3.2 Carriage of SVC in MPEG-2 Systems", 83rd MPEG Meeting (Motion Picture Expert Group or ISO/IEC JTC1/SC29/WG11), Feb. 7, 2008.
S. Narasimhan, et al., "Signaling framework to support HEVC scalability", 101st MPEG Meeting, Jul. 11, 2012.
Y-K Wang, et al., "SVC hypothetical reference decoder (HRD)", 21st JVT Meeting, 78th MPEG Meeting; Oct. 20, 2006.
J. Chen, et al., "SHVC Draft Text 1", Document of Joint Collaborative Team on Video Coding, JCTVC-L1008, Jan. 14-23, 2013.
J. Boyce, et al. "VPS Support for Out-of-Band Signaling and Hybrid Codec Scalability", Vidyo Personal Telepresence, JCTVC-K0206, Oct. 10-19, 2012.
P A Chou, et al., "A generalized hypothetical reference decoder for H.264/AVC", IEEE Transactions on Circuits and Systems for Video Technology, vol. 13, No. 7, Jul. 1, 2013.
PCT Search Report & Written Opinion, RE: Application No. PCT/US2014/033236, dated Jul. 2, 2014.
Anonymous, "Requirements of the Scalable Enhancement of HEVC", 101st MPEG Meeting (Motion Picture Experts Group or ISO/IEC/JTC1/SC29/WG11, Aug. 3, 2012, 12 pgs.
PCT Search Report & Written Opinion, RE: Application No. PCT/US2015/031897; dated Jul. 17, 2015.
S. Narasimhan, et al., "Consideration of buffer management issues and layer management in HEVC scalability", 14th JCT-VC Meeting (Joint Collaborative Team on Video Coding of ISO/IEC JTC1/SC29/WG11 and ITU-T SG.16), Jul. 24, 2013.
S. Narasimhan, et al., "Multilayer HRD Management", 15th JCT-VC Meeting Joint Collaborative Team on Video Coding of ISO/IEC JTC1/SC29/WG11 and ITU-T SG.16), Oct. 24, 2013.
PCT International Search Report & Written Opinion, Re: Application No. PCT/US2015/031903, dated Jul. 21, 2015.
"Text of ISO/IEC 13818-1:2013 PDAM 7 Carriage of Layered HEVC", 108th MEPG Meeting (Motion Picture Expert Group or ISO/IEC JTC1/SC29/WG11), May 8, 2014.
"Text of ISO/IEC 13818-1:2013/FDAM 3 Carriage of HEVC", 105th MEPG Meeting (Motion Picture Expert Group or ISO/IEC JTC1/SC29/WG11), Sep. 6, 2013.

* cited by examiner

SIGNALING FOR ADDITION OR REMOVAL OF LAYERS IN VIDEO CODING

CROSS-REFERENCES TO RELATED APPLICATIONS

This application is a continuation of U.S. patent application Ser. No. 16/038,470 filed on Jul. 18, 2018, which is a continuation of U.S. patent application Ser. No. 14/246,699 filed on Apr. 7, 2014, now U.S. Pat. No. 10,063,868, which claims priority to U.S. Provisional App. No. 61/809,741, entitled "Consideration of Buffer Management Issues and Layer Management in HEVC Scalability", filed Apr. 8, 2013, the contents of each incorporated herein by reference in their entirety.

BACKGROUND

Scalable video coding supports decoders with different capabilities. An encoder generates multiple encoded bitstreams for an input video. This is in contrast to single layer coding, which only uses one encoded bitstream for a video, in the scalable video coding, one of the output encoded bitstreams, referred to as the base layer (BL), can be decoded by itself and this encoded bitstream provides the lowest scalability level of the video output. To achieve a higher level of video output, the decoder can process the base layer bitstream together with other encoded bitstreams, referred to as enhancement layers (EL). The enhancement layer may be added to the base layer to generate higher scalability levels. One example is spatial scalability, where the base layer represents the lowest resolution video and the decoder can generate higher resolution video using the base layer bitstream together with additional enhancement layer bitstreams. Thus, using additional enhancement layer bitstreams produce a better quality video output, such as by achieving temporal, signal-to-noise ratio (SNR), and spatial improvements.

In scalable video, an encoder may encode the base layer and enhancement layers. Further, parameter settings may be determined for the layers. For example, parameter settings for the base layer and any combination of the base layer and enhancement layers are determined. That is, if a combination of a base layer and an enhancement layer is available, the parameter settings govern the combined base layer and enhancement layer. The parameter settings may then be included in a video layer of the encoded bitstreams for the encoded base layer and enhancement layers. The pre-encoded video data is then stored in storage, such as an archive that stores the encoded layers and parameter settings. When a transmitter wants to send the video to one or more decoders, the transmitter may retrieve the encoded bitstreams for the applicable layers from storage and send the encoded bitstreams to the decoder.

When the user wants to add a layer for the video to the already encoded layers, the parameter settings for the layers stored in storage do not take into account the presence of the additional layer. To account for the additional layer, the parameter settings must be changed to reflect the addition of the layer. For example, changes to both the video layer and the transport layer for all of the pre-encoded layers may need to be changed for each picture. This is because the parameter settings for the base layer and enhancement layers are being governed by the combination of the enhancement layers with the base layer and thus the parameter settings may be dependent on the newly added enhancement layer. This introduces major complexity for re-distribution transmission equipment that send the pre-encoded video stream.

SUMMARY

In one embodiment, a method determines an encoded plurality of layers for a scalable video stream for a video where each of the plurality of layers includes a respective layer parameter setting. An additional layer for the plurality of layers is determined where the additional layer enhances a base layer in the plurality of layers and the respective layer parameter settings for the encoded plurality of layers do not take into account the additional layer. The method then determines an additional layer parameter setting for the additional layer. The additional layer parameter setting specifies a relationship between the additional layer and at least a portion of the plurality of layers where the additional layer parameter setting is used to decode the additional layer and the at least a portion of the plurality of layers.

In one embodiment, An apparatus includes: one or more computer processors; and a non-transitory computer-readable storage medium comprising instructions that, when executed, control the one or more computer processors to be configured for: determining an encoded plurality of layers for a scalable video stream for a video, wherein each of the plurality of layers includes a respective layer parameter setting; determining an additional layer for the plurality of layers, wherein the additional layer enhances a base layer in the plurality of layers and the respective layer parameter settings for the encoded plurality of layers do not take into account the additional layer; determining an additional layer parameter setting for the additional layer, the additional layer parameter setting specifying a relationship between the additional layer and at least a portion of the plurality of layers, wherein the additional layer parameter setting is used to decode the additional layer and the at least a portion of the plurality of layers; and sending the at least a portion of the plurality of layers and the additional layer to a decoder along with respective layer parameter settings for the at least a portion of the plurality of layers and the additional layer parameter setting.

In one embodiment, an apparatus includes: one or more computer processors; and a non-transitory computer-readable storage medium comprising instructions that, when executed, control the one or more computer processors to be configured for: receiving at least a portion of a plurality of layers for a sealable video stream for a video, wherein each of the plurality of layers includes a respective layer parameter setting; receiving an additional layer for the plurality of layers, wherein the additional layer enhances a base layer in the plurality of layers and the respective layer parameter settings for the encoded plurality of layers do not take into account the additional layer; receiving an additional layer parameter setting for the additional layer, the additional layer parameter setting specifying a relationship between the additional layer and at least a portion of the plurality of layers, wherein the additional layer parameter setting is used to decode the additional layer and the at least a portion of the plurality of layers; and decoding the at least a portion of the plurality of layers and the additional layer using the respective layer parameter settings for the at least a portion of the plurality of layers and the additional layer parameter setting.

The following detailed description and accompanying, drawings provide a better understanding of the nature and advantages of particular embodiments.

DETAILED DESCRIPTION

Described herein are techniques for a system to add or remove enhancement layers. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments add or remove enhancement layers from pre-encoded (or compressed video that has been stored (e.g., archived). The pre-encoded layers are encoded without taking into account the additional layer. Layers may be added to increase the quality of the video, such as by increasing the frame rate or picture sizes of the video. Particular embodiments provide the ability to add layers using multiple signaling mechanisms. A first mechanism uses a video stream parameter to indicate that in future there may be new layers and the explicit parameters for these new layers (such as video data rate, buffer size, and how these new layers are combined with other layers) will be signaled, such as in a transport stream. When the signaling that new layers may be added is embedded in the video layer for pre-encoded content, there is no need to alter prior video data at re-distribution transmission points. That is, layer parameter settings for the pre-encoded video do not need to be changed. Particular embodiments also provide new descriptors, such as in the transport stream, that signal the new layer parameters and any changes to parameters for the pre-encoded layers.

Figure 1:
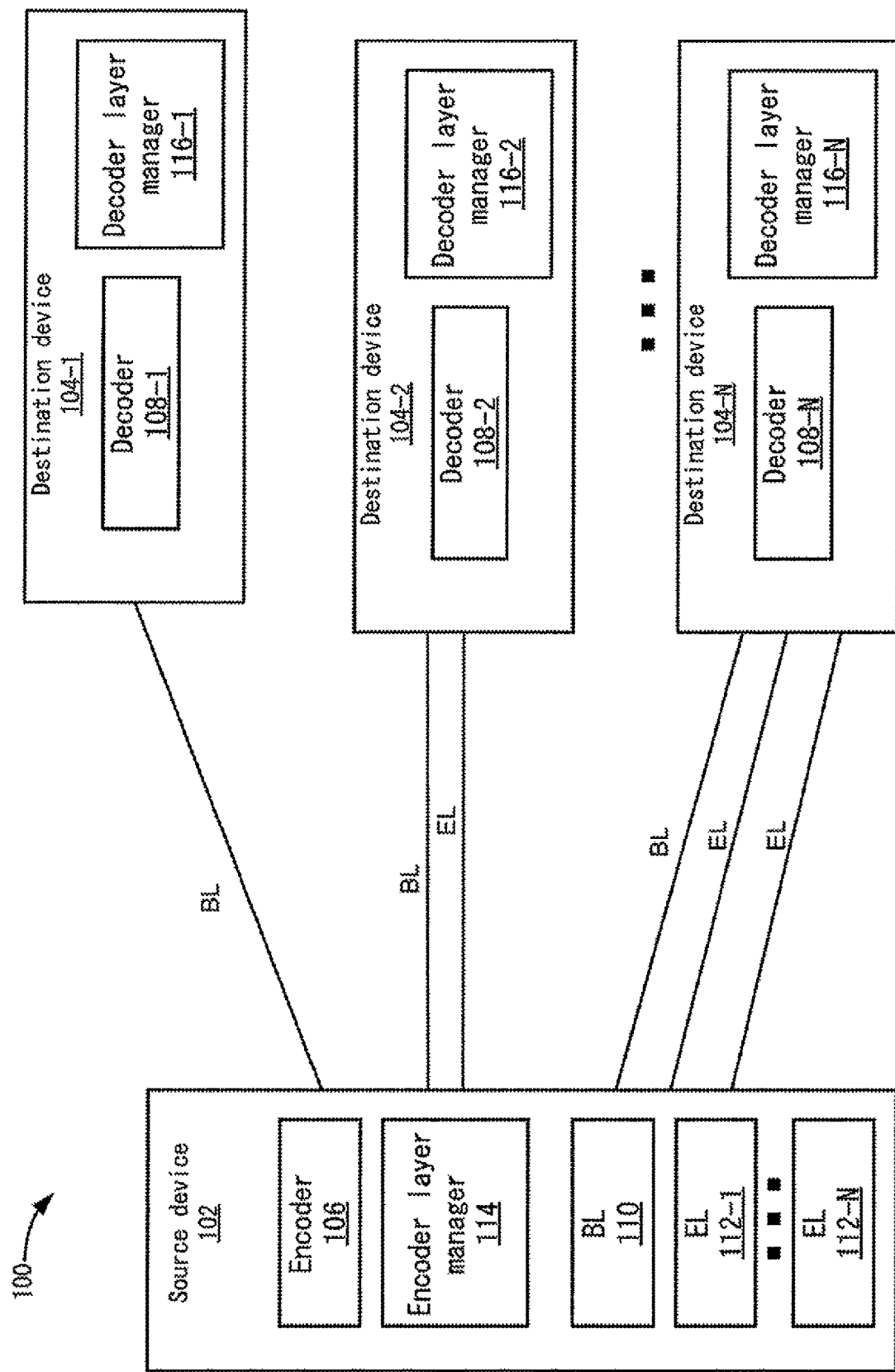
FIG. 1 depicts a system for providing scalable video with the capability of adding additional layers or removing layers according to one embodiment.

FIG. 1 depicts a system 100 for providing scalable video with the capability of adding additional layers or removing layers according to one embodiment. System 100 includes a source device 102 and a plurality of destination devices 104-1-104-N. Source device 102 includes an encoder 106 and each destination device 104-1-104-N includes a respective decoder 108-1-108-N. Source device 102 may be a device that transmits encoded video to destination devices 104. In one embodiment, source device 102 may include a server or any other networking device or system that can encode video and transmit encoded video. Destination devices 104 may include devices that are capable of decoding the encoded video. Destination devices 104 may include networking devices, set top boxes, cellular phones, televisions, and any other computing devices.

In scalable video coding, such as in High Efficiency Video Coding (HEVC) scalable video coding, encoder 106 may generate multiple bitstreams for an input video. Although HEVC is mentioned, other video coding standards may apply. As mentioned above, the base layer may be decoded by itself and provides the lowest scalability level of the video output, and additional enhancement layers may be combined with the base layer to generate higher scalability levels. The enhancement layers enhance other layers, such as zero or more enhancement layers and the base layer. As shown, encoder 106 may generate a base layer (BL) 110 and any number of enhancement layers (EL) 112-1-112-N.

Destination devices 104 may request different layers from source device 102 depending on the destination device's capabilities. Source device 102 always needs to send base layer 110 to destination devices 104. However, source device 102 may send any number of enhancement layers 112 to destination devices 104 including no enhancement layers 112. As shown in FIG. 1, destination device 104-1 only receives base layer 110. In this case, destination device 104-1 may only have the capability of generating the lowest resolution video. Destination device 104-2 receives the base layer 110 and one enhancement layer 112-1. Decoder 108-2 can combine the base layer 110 and enhancement layer 112-1 to generate a higher resolution video. Also, destination device 104-N receives base layer 110 and enhancement layers 112-1-112-N. Decoder 108-N combines base layer 110 and the received enhancement layers 112-1-112-N. The above process may save bandwidth. For example, decoder 108-1 may only be able to decode the base layer and thus not receiving the enhancement layers may reduce the bandwidth required to send the video stream to destination device 104-1. The same is true for destination device 104-2 as less enhancement layers are sent to destination device 104-2 than to device 104-N.

An encoder layer manager 114 and decoder layer managers 116-1-116-N may manage layers to allow the capability to support additional layers or the removal of layers for the video. As will be discussed in more detail below, base layer 110 and enhancement layers 112-1-112-N for a video may be pre-encoded (e.g., pre-compressed) and stored (e.g., archived). Parameter settings for the layers may be included in the pre-encoded bitstreams in the video layer. Also, layer parameter settings for the transport layer may also be stored. These layer parameter settings were included in the encoded bitstreams before the existence of the additional layer and did not take into account the additional layer. Encoder layer manager 114 and decoder layer manager 116 may allow the addition or removal of an enhancement layer for the pre-encoded video without having to adjust the layer parameter settings for the pre-encoded bitstreams. This process will be described in more detail below.

Figure 2:
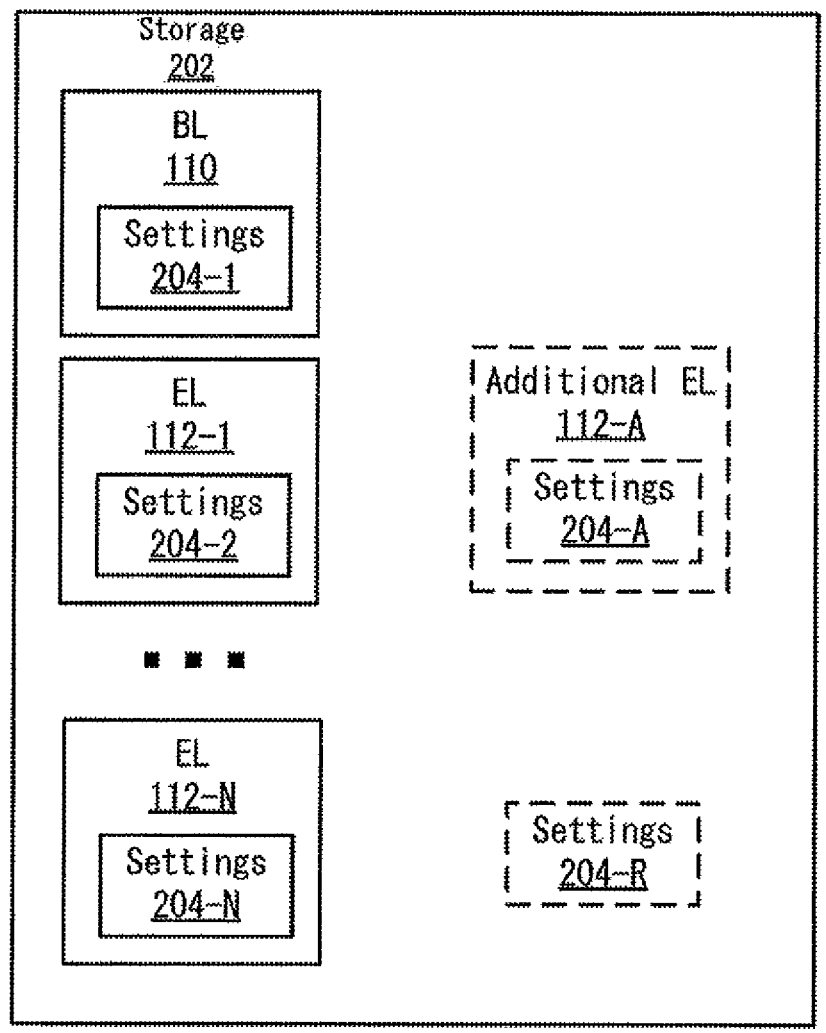
FIG. 2 depicts an example of storage that includes pre-encoded video according to one embodiment.

FIG. 2 depicts an example of storage 202 that includes pre-encoded video according to one embodiment. As shown, storage 202 includes base layer 110 and enhancement layers 112-1-112-N. Base layer 110 and enhancement layers 112 have been encoded previously and stored in storage 202. For example, as discussed above, storage 202 may be an archive that is storing the pre-compressed content.

Each layer may include layer parameter settings. For example, base layer 110 includes layer parameter settings 204-1; enhancement layer 112-1 includes layer parameter settings 204-2; and enhancement layer 112-N includes layer parameter settings 204-N. Each layer parameter setting may include parameters that may be used to encode and/or decode the respective layer. In one example, a respective parameter setting 204 may include parameters that individually manage a buffer that is only storing the specific layer. For example, base layer 110 and enhancement layers 112 may be individually stored in a set of buffers. Decoder 108 may manage the individual buffers based on the buffer parameter settings. In one embodiment, parameter settings may manage the video bitrate, buffer size, and how respective layers are combined with other layers.

Particular embodiments allow for an additional enhancement layer 112-A to be added to already encoded video without changing layer parameter settings for the already encoded video that did not take into account additional enhancement layer 112-A. With the addition of additional enhancement layer 112-A, additional layer parameter settings 204-A are also provided. Additional parameter settings 204-A allow encoder 106 and decoder 108 to add additional enhancement layer 112-A without having to change parameter settings 204-1-204-N for base layer 110 and enhancement layers 112-1-112-N, respectively. In one embodiment, these parameter settings may be included in the video layer and may be difficult to change. Also, any parameter settings included the transport layer may also not need to be changed when additional enhancement layer 112-A is added.

As will be described in more detail below, additional layer parameter settings 204-A may detail information needed to add enhancement layer 112-A. This information may include relationships between additional enhancement layer 112-A and any layers stored in storage 202 and/or changes to any parameter settings 204-1-204-N that are stored in storage 202. In one embodiment, additional layer parameter settings 204-A may include layer-specific information and also layer-dependent information. Layer-specific information may be specific to a certain layer. For example, the layer-specific information may be individual buffer management parameters for a respective layer. The buffer management parameters may be for additional enhancement layer 112-A or for any other layer stored in storage 202. The layer-dependent information may be information that affects other layers. For example, the layer-dependent information may include a layer hierarchy that indicates the hierarchy of the enhancement layers. This layer hierarchy may change with the addition of enhancement layer 112-A. Further, what layers should be combined with additional layer 112-A may also be included in the layer dependent information. For example, the base layer may be combined with three enhancement layers and additional layer parameter settings 204-A may specify which three layers should be combined with the base layer based on the addition of additional layer 112-A.

Particular embodiments may also remove a layer. In this case, one of enhancement layers 112-1-112-N may be removed from being used in decoding the video. When removal occurs, a removed layer parameter setting 204-R may be provided. Parameter settings in removed layer parameter settings 204-R may be used to manage decoding of the remaining layers upon removal. For example, removed layer parameter settings 204-R may detail any information in parameter settings 204-1-204-N that need to be changed based on the removal of the layer, such as any changes in the hierarchy or which layers combine with each other may be changed. In one example, the hierarchy may be changed based on the removal of an enhancement layer. Further, any combination that includes the removed layer may be changed by layer parameters settings 204-R.

The additional layer parameter settings 204-A (and removed layer parameter settings 204-R) may be sent from encoder 106 to decoder 108 using different methods. For example, particular embodiments provide the ability to add layers using multiple signaling mechanisms. The first mechanism uses a video layer parameter, such as a VPS (video parameter set) and/or a SPS (sequence parameter set), to indicate that in future there may be new layers. The second signaling mechanism may signal the explicit parameters for these new layers (such as video data rate, buffer size, and how these new layers are combined with other layers) in a transport stream (or the video stream).

Encoder layer manager 114 may be part of re-distribution transmission equipment that is sending the video stream to decoders 104. Encoder layer manager 114 may signal additional layer parameter settings 204-A in-band or out-of-band with the encoded bitstreams for base layer 110 and enhancement layers 112. In-band may mean the additional layer parameter settings 204-A may be sent in a VPS or SPS and out-of-band may be where additional layer parameter settings 204-A are sent in a systems layer using the transport stream.

Figure 3:
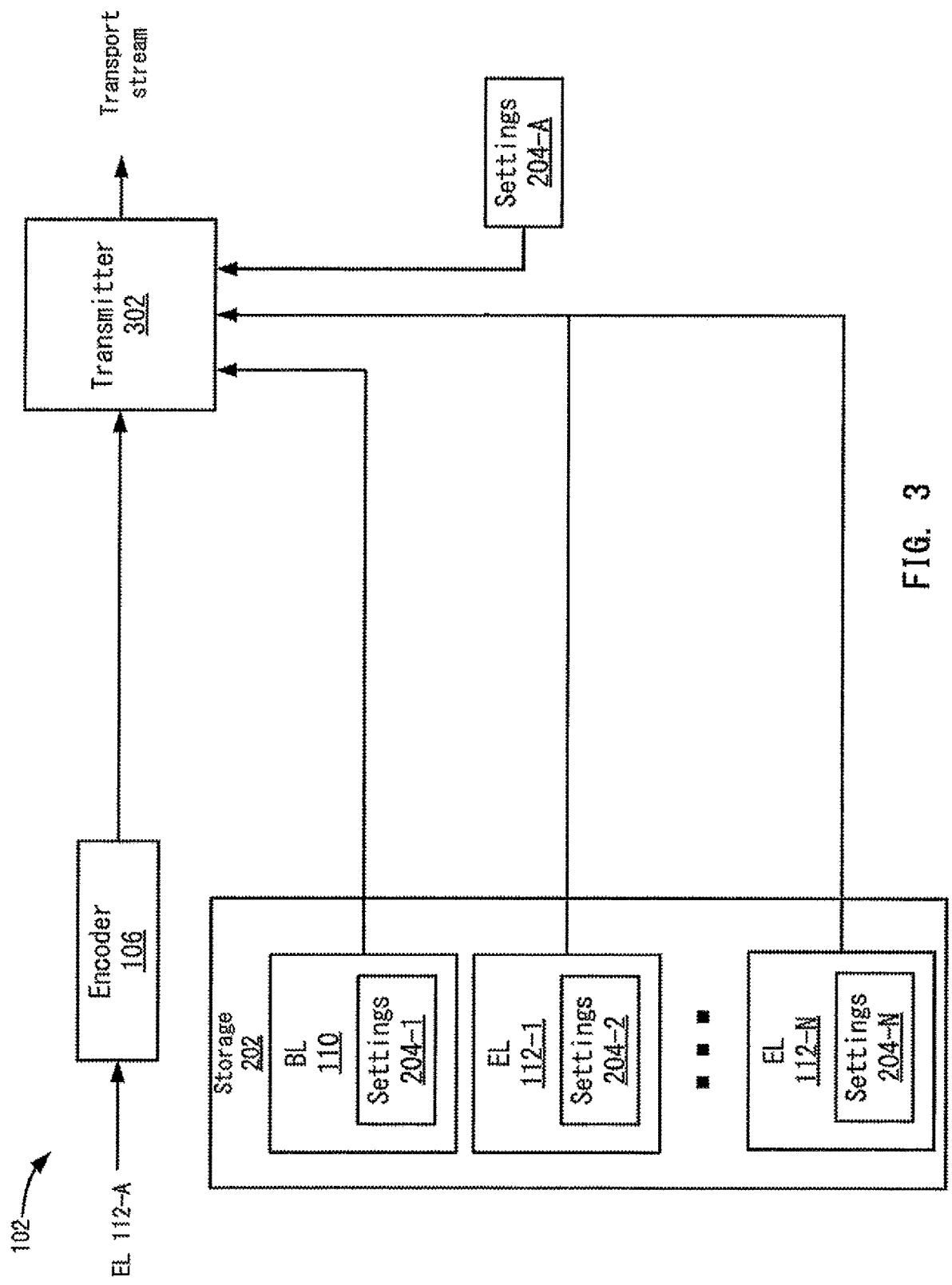
FIG. 3 depicts an example of a source device for sending the additional layer and/or additional layer parameter settings according to one embodiment.

The following will now describe source device 102 and destination device 104 in more detail. FIG. 3 depicts an example of source device 102 for sending the additional layer 112-A and/or additional layer parameter settings 204-A according to one embodiment. Because base layer 110 and enhancement layers 112-1-112-N have been already encoded and stored in storage 202, encoder 106 does not have to encode these layers again. Although not re-encoding video for base layer 110 and enhancement layers 112-1-112-N is discussed, encoder 106 may also re-encode these layers.

Encoder 106 encodes the new enhancement layer 112-A into an encoded bitstream. The encoded bitstream for enhancement layer 112-A may be used to enhance base layer 110 (and other enhancement layers), such as by increasing the frame rate or resolution.

Transmitter 302 receives base layer 110 and enhancement layers 112-1-112-N and additional enhancement layer 112-A, and transmits the bitstreams to a destination device 104. For example, as discussed above, different destination devices 104 may request different layers depending on their capabilities. Transmitter 302 may determine which layers have been requested by a destination device 104 and send those layers in a transport stream. In one embodiment, transmitter 302 may packetize the encoded bitstreams for the requested layers in a packetized elementary stream (PES) and send the packets in the transport stream to destination device 104.

Transmitter 302 may also send layer parameter settings 204 for additional enhancement layer 112-A (or any of the layers being sent) in the transport stream. First, however, a parameter may be set in the video layer (in the encoded bitstream of one of the pre-encoded bitstreams) that indicates that the video stream may include additional layers and the additional layer parameters may be found in the transport stream. In one embodiment, the parameter indicating the video stream may include additional layers may be set in the pre-encoded video bitstream or dynamically set when the additional layer is added.

Transmitter 302 then sends additional layer parameter settings 204-A in packets included in the transport stream. In one example, layer parameter setting 204-1 for base layer 110 may be sent in the encoded bitstream that is encapsulated in packets in the transport stream. This parameter setting 204-1 may be the same parameter setting stored in storage 202. Also, for any enhancement layers 112 that are sent from storage 202, the respective layer parameter settings 204 are also sent in the encoded bitstream included in the packets in the transport stream. These are also the same layer parameter settings 204 that are stored in storage 202. Layer parameter settings 204 may also be sent in the transport layer in packets.

In another embodiment, if the removal of a layer is performed, transmitter 302 includes removed layer parameter settings 204-R in packets included in the transport stream. In this case of removing a layer, an encoded bitstream for the removed enhancement layer is not included in the transport stream.

Figure 4:
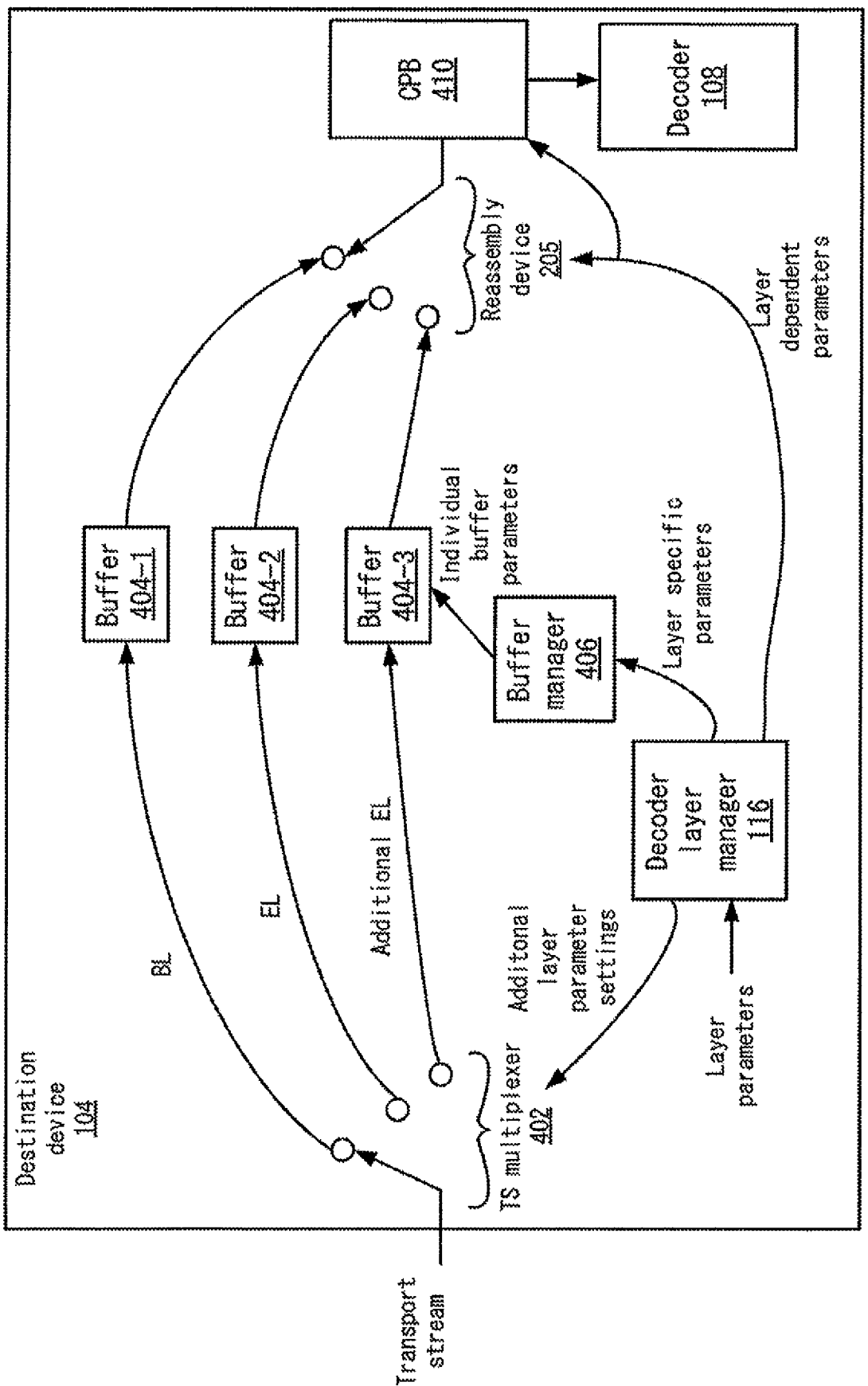
FIG. 4 depicts a more detailed example of a destination device for decoding bitstreams using additional layer parameter settings according to one embodiment.

Destination device 104 receives the transport stream and then decodes the encoded bitstreams found in the transport stream using the layer parameter settings. FIG. 4 depicts a more detailed example of destination device 104 for decoding bitstreams using additional layer parameter settings 204-A according to one embodiment. The transport stream is received at a transport stream (TS) demultiplexer 402. The transport stream may be an encoded bitstream that may be packets that include the encoded bitstream for all layers intermixed. Each packet may include information for a single layer, however, and are identified via a packet identifier (ND) for the respective layer. TS demultiplexer 402 uses the packet identifier to demultiplex the transport stream. That is, TS demultiplexer 402 forwards transport stream packets to various buffers that handle respective layers. In one example, TS demultiplexer 402 sends the packets for base layer 110 in a first stream and TS demultiplexer 402 sends packets for enhancements layers 112 in second and third streams, respectively.

Buffers 404-1-404-3 are included in a single destination device 104. Buffer 402-1 receives base layer 110 from encoder 106, and buffers 404-2-404-3 receive respective an enhancement layer 112 and additional enhancement layer 112-A.

Decoder layer manager 116 receives the layer parameter settings 204 from the packets included in the transport stream. This includes respective layer parameter settings for the layers included in the video layer or the transport layer. In one embodiment, decoder layer manager 116 determines that a setting in the video layer indicates an additional layer may be added, and then decoder layer manager 116 determines additional layer parameter settings 204-A from the transport layer.

Decoder layer manager 116 then uses additional layer parameter settings 204-A in the decoding process. As mentioned above, the additional layer parameter settings 204-A may include layer-specific parameter settings and layer-dependent parameter settings. Decoder layer manager 116 may apply layer-specific or layer-dependent settings in the decoding process. One example of layer-specific parameter settings is settings for buffers 404. In this case, decoder layer manager 116 may send buffer parameter settings to a buffer manager 406. Buffer manager 406 may then manage individual buffers for each respective layer. For example, individual buffer settings may be provided for buffer 404-1 for base layer 110 and buffers 404-2-404-3 for enhancement layers 112.

Buffer manager 406 manages the input and output of buffers 404-2-404-3 before base layer 119 and enhancement layers 112 are combined. That is, the layer-specific information may be for an individual buffer 404-3 that is buffering additional enhancement layer 112-A, such as a bitrate and buffer size parameters that are applied to buffer 404-3. Additionally, the layer-specific parameters may specify changes to buffer parameters that were stored in storage 202. In this case, different individual parameters for buffers 404-1-404-2 may be set by buffer manager 406 in light of additional layer parameter settings 204-A. In one embodiment, U.S. Patent Application No. 61/809,741 entitled "Individual Buffer Management in Video Coding", filed concurrently, and incorporated by reference in its entirety, describes individual buffer management in more detail. Providing individual buffer management may allow the addition of additional enhancement layer 112-A because the buffer parameters are managed individually for layers and thus buffer parameters for pre-encoded layers do not need to be changed to add additional enhancement layer 112-A.

Decoder layer manager 116 may also manage layer-dependent parameter settings. In one embodiment, decoder layer manager 116 may send the layer-dependent parameter settings to buffer manager 406, decoder 108, or other components in the decoding process. In one example, the layer-dependent parameters include a hierarchy from additional layer parameter settings 204-A. The hierarchy indicates the layer hierarchy for the layers that are read out of buffers 404 to reassembly manager 408. For example, the layer hierarchy indicates the position of the enhancement layers for combination into the combined bitstream. Reassembly manager 408 may then reassemble a combined encoded bitstream from the layers read out of buffers 404 based on the layer hierarchy. Also, additional layer parameter settings 204-A may indicate to reassembly manager 408 which layers are combined with additional enhancement layer 112-A.

A coded picture buffer (CPB) 410 then stores pictures for the combined encoded bitstream. Decoder 108 reads the encoded pictures from coded picture buffer 410 and decodes the pictures. Also, decoder 108 may use parameters from additional layer parameter settings 204-A in decoding the pictures along with parameter settings from layer parameter settings 204-1-204-N. Once the pictures are decoded, decoder 108 then stores the decoded pictures in a decoded picture buffer.

Figure 5:
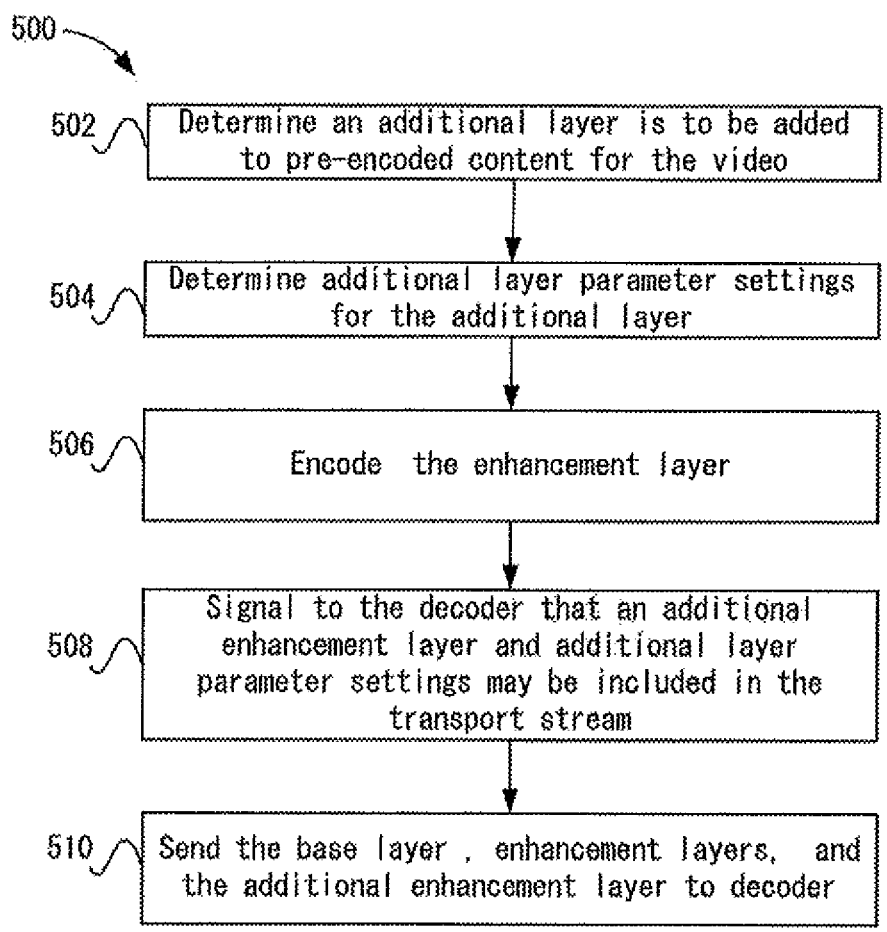
FIG. 5 depicts a simplified flowchart of a method for encoding video according to one embodiment.

FIG. 5 depicts a simplified flowchart 500 of a method for encoding video according to one embodiment. At 502, encoder 106 determines an additional layer is to be added to pre-encoded content for the video. At 504, encoder 106 determines additional layer parameter settings 204-A for the additional layer. Then, at 506, encoder 106 encodes enhancement layer 112-A.

At 508, transmitter 302 signals to decoder 108 that an additional enhancement layer 112-A and additional layer parameter settings 204-A may be included in the transport stream. For example, a setting in the video layer may indicate this. At 510, transmitter 302 sends base layer 110, enhancement layers 112-1-112-N, and additional enhancement layer 112-A to decoder 108. This stream may include layer parameter settings 204-1-204-N. Also, at 512, transmitter 302 sends additional layer parameter settings 204-A to decoder 108.

Figure 6:
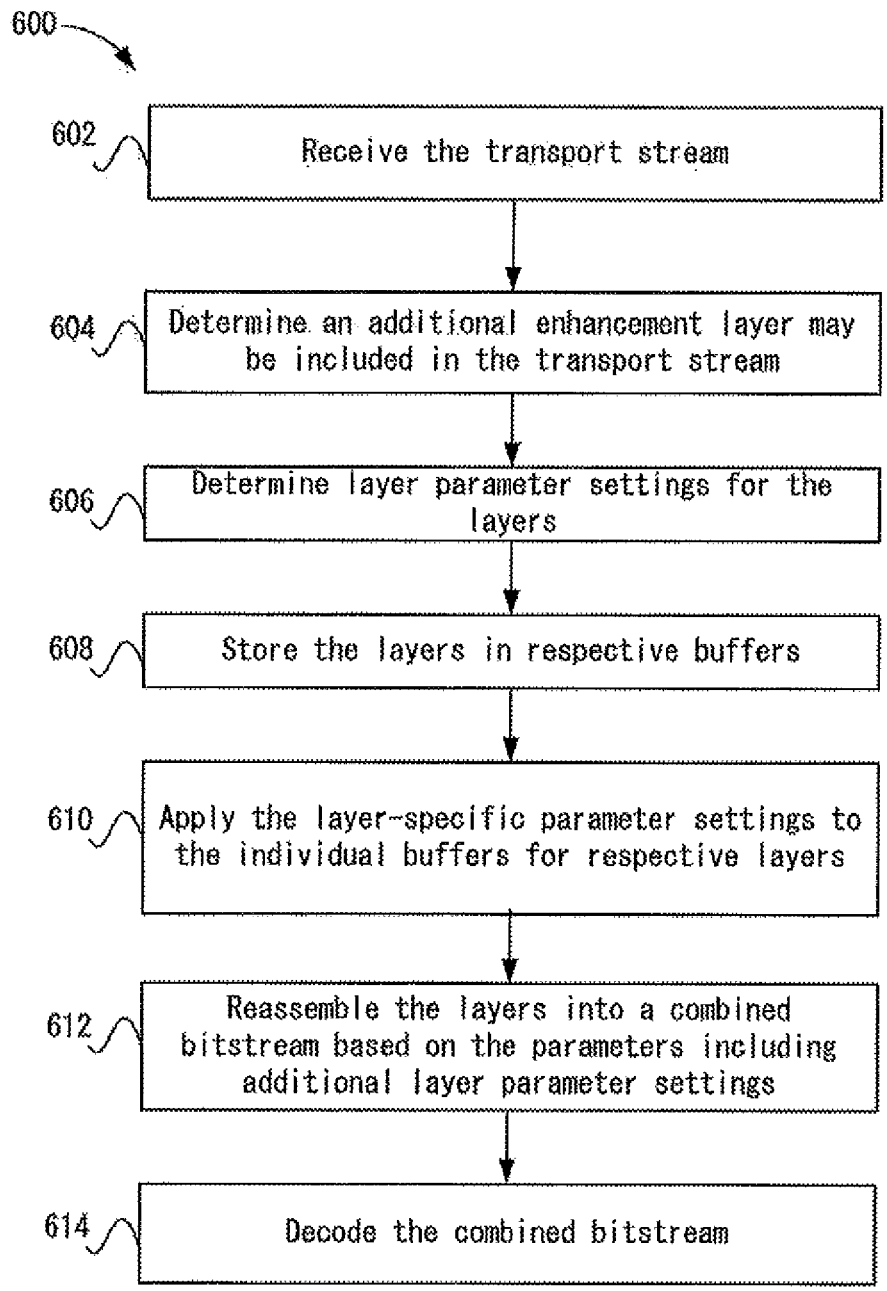
FIG. 6 depicts a simplified flowchart of a method for decoding a video stream according to one embodiment.

FIG. 6 depicts a simplified flowchart 600 of a method for decoding a video stream according to one embodiment. At 602, decoder 108 receives the transport stream. At 604, decoder 108 determines an additional enhancement layer 112-A may be included in the transport stream. For example, the setting in the video layer indicates additional layers may be included and additional layer parameter settings 204-A are included in the transport layer. At 606, decoder 108 determines layer parameter settings 204 for the layers. This includes determining additional layer parameter settings 204-A.

At 608, decoder 108 stores the layers in respective buffers 404. At 610, decoder 108 applies layer-specific parameter settings to the individual buffers for respective layers. At 612, decoder 108 reassembles the layers into a combined bitstream based on the parameters including additional layer parameter settings 204-A. Then, at 614, decoder 108 decodes the combined bitstream.

The following with describe an example of a syntax that may be used to signal additional layer parameter settings 204-A. As mentioned above, different signaling mechanisms may be used to signal the addition of a layer. In one embodiment, additional layer parameter settings 204-A may be included in a video parameter set (VPS) and/or a sequence parameter set (SPS). The video parameter set and sequence parameter set may be embedded in the encoded bitstream of base layer 110 and/or enhancement layers 112 to indicate that an additional layer may be included and additional layer parameter settings 204-A may be included in the transport stream.

Additional layer parameter settings 204-A may be included in the transport stream in different ways. For example, a video descriptor may signal the additional layer parameter settings 204-A, such as the buffer parameter settings for additional enhancement layer 112-A. In one example, the video descriptor may signal additional layer parameter settings 204-A in a program map table (PMT) for the video. In another embodiment, additional layer parameter settings 204-A may be included in a hierarchy descriptor that includes information on how additional enhancement layer 112-A can be added to the pre-encoded layers in the same PMT.

The following shows an example of a scalable video descriptor in Table I. For example, a scalable HEVC video descriptor is used. The video descriptor provides basic information for identifying coding parameters of the associated video stream, such as profile and level parameters.

TABLE I

Scalable HEVC video descriptor

| Syntax | No. Of bits | Mnemonic |
|---|---|---|
| Scalable HEVC_descriptor( ) { | | |
|   descriptor_tag | 8 | uimsbf |
|   descriptor_length | 8 | uimsbf |
|   profile_idc | 8 | uimsbf |
|   reserved_zero_8bits | 8 | bslbf |
|   level_idc | 8 | uimsbf |
|   layer_parameter_present_flag | 1 | bslbf |
|   reserved | 7 | bslbf |
|   if ( layer_parameter_present_flag == '1' { | | |
|     layer_max_bit_rate | 32 | uimsbf |
|     reserved | 8 | bslbf |
|     layer_max_buffer_size | 32 | uimsbf |
|     reserved | 8 | bslbf |
|   } | | |
| } | | |

The following definitions are provided for the scalable video descriptor. These may be parameters in additional layer parameter settings 204-A:

profile_idc—This 8-bit field indicates the profile, as defined in the HEVC specification.

reserved_zero_8bits—This 8-bit field shall be copied from the 8 bits immediately following the profile_idc syntax element in the sequence_parameter_set according to the HEVC specification.

level_idc—This 8-bit field indicates the level, as defined in the HEVC specification.

Layer_parameter_present_flag—This 1-bit flag when set to '1' indicates that the syntax elements describing a new layer buffer parameters are included in this descriptor.

Layer_max_bit_rate—This 32-bit field indicated the maximum bit rate of new layer video to the input of buffer.

Layer_max_buffer_size—This 32-bit field indicated the maximum buffer size of new layer video.

In another embodiment, a hierarchy descriptor may be used as shown in Table II according to one embodiment. The HEVC hierarchy descriptor provides information to identify the program elements containing components of HEVC scalable video with spatial, temporal, SNR, view-texture and view-depth scalability. Additional layer parameter settings 204-A may be included in the hierarchy descriptor.

TABLE II

HEVC Hierarchy descriptor

| Syntax | No. of bits | Mnemonic |
|---|---|---|
| hierarchy_descriptor( ) { | | |
|   descriptor_tag | 8 | uimsbf |
|   descriptor_length | 8 | uimshf |
|   reserved | 1 | bslbf |
|   temporal_scalability_flag | 1 | bslbf |
|   spatial_scalability_flag | 1 | bslbf |
|   quality_scalability_flag | 1 | bslbf |
|   view_scalability_texture_flag | 1 | bslbf |
|   view_scalability_depth_flag | 1 | bslbf |
|   reserved | 2 | bslbf |
|   hierarchy_layer_index | 6 | uimsbf |
|   reserved | 2 | bslbf |
|   hierarchy_embedded_layer_index | 6 | uimsbf |
|   reserved | 2 | bslbf |
| } | | |

The following are definitions of portions of the hierarchy descriptor:

temporal_scalability_flag—A 1-bit flag, which when set to '0' indicates that the associated program element enhances the temporal rate (such as frame rate) of the bit-stream resulting from the program element referenced by the hierarchy_embedded_layer_index. The value of '1' for this flag is reserved.

spatial_scallability_flag—A 1-bit flag, which when set to '0' indicates that the associated program element enhances the spatial resolution of the bit-stream resulting from the program element referenced by the hierarchy_embedded_layer_index. The value of '1' for this flag is reserved.

quality_scalability_flag—A 1-bit flag, which when set to '0' indicates that the associated program element enhances the SNR quality or fidelity of the bitstream resulting from the program element referenced by the hierarchy_embedded_layer_index. The value of '1' for this flag is reserved.

view_scalability_texture_flag—A 1-bit flag, which when set to '0' indicates that the associated program element enhances the texture view scalability of the bit-stream resulting from the program element referenced by the hierarchy_embedded_layer_index. The value of '1' for this flag is reserved.

view_scalability_depth_flag—A 1-bit flag, which when set to '0' indicates that the associated program element enhances the depth view scalability of the bit-stream resulting from the program element referenced by the hierarchy_embedded_layer_index. The value of '1' for this flag is reserved.

hierarchy_layer_index—The hierarchy_layer_index is a 6-bit field that defines a unique index of the associated program element in a table of coding layer hierarchies. Indices shall be unique within a single program definition. For video sub-bitstreams of HEVC video streams conforming to one or more scalable profiles this is the program element index, which is assigned in a way that the bitstream order will be correct if associated enhancement layer representations of the video sub-bitstreams of the same access unit are re-assembled in increasing order of hierarchy_layer_index.

hierarchy_embedded_layer_index—The hierarchy embedded layer index is a 6-bit field that defines the hierarchy_layer_index of the program element that needs to be accessed and be present in decoding order before decoding of the elementary stream associated with this HEVC_hierarchy_descriptor.

Particular embodiments may be implemented in a non-transitory computer-Readable storage medium for use by or in connection with the instruction execution system, apparatus, system, or machine. The computer-Readable storage medium contains instructions for controlling a computer system to perform a method described by particular embodiments. The Computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for decoding a transport stream including one or more descriptors carrying syntax elements for an encoded plurality of layers, the method comprising:
   receiving the transport stream that includes the encoded plurality of layers;
   identifying at least one syntax element from the one or more descriptors in the transport stream to determine a respective layer parameter setting for each of the encoded plurality of layers;
   identifying from the one or more descriptors at least one additional layer parameter setting for an additional layer decodable in the transport stream in addition to the encoded plurality of layers, the at least one additional layer parameter setting including a hierarchy parameter indexing a dependency between the additional layer and at least a portion of the encoded plurality of layers, wherein the at least one additional layer parameter setting is for decoding the additional layer and the at least a portion of the encoded plurality of layers; and
   using the at least one syntax element for decoding of streams carried in the transport stream.

2. The method of claim 1, further comprising: decoding the transport stream to reconstruct the additional layer and the plurality of layers using the respective layer parameter settings for each of the layers.

3. The method of claim 1, further comprising: using the at least one additional layer parameter setting to present elementary streams associated with the plurality of layers and the additional layer in decoding order to a decoding process.

4. The method of claim 3, wherein receiving comprises: receiving the at least one additional layer parameter setting in a transport layer for the additional layer and the at least a portion of the plurality of layers.

5. The method of claim 4, wherein the at least one additional layer parameter setting is receiving in at least one of the one or more descriptors in the transport layer.

6. The method of claim 3, wherein receiving comprises: receiving the respective layer parameter settings in a video layer for the at least a portion of the plurality of layers.

7. The method of claim 1, further comprising: identifying a parameter indicating that additional layers may be added to the at least a portion of the plurality of layers in a video layer.

8. The method of claim 7, wherein the parameter in the video layer indicates that the at least one additional layer parameter setting will be included in a transport layer.

9. The method of claim 7, wherein the parameter is included in a video parameter set (VPS) or a sequence parameter set (SPS) in one of the encoded at least a portion of the plurality of layers.

10. The method of claim 1, wherein the at least one additional layer parameter setting specifies layer specific information for the additional layer.

11. The method of claim 1, wherein the at least one additional layer parameter setting specifies layer dependent information for the additional layer and the at least a portion of the plurality of layers.

12. The method of claim 1, wherein the respective layer parameter settings for the additional layer and the at least a portion of the plurality of layers manage individual buffer settings at a decoder for each of the additional layer and the at least a portion of the plurality of layers.

13. The method of claim 1, further comprising:
   decoding the at least a portion of the plurality of layers excluding layer parameter setting associated with a layer removed during encoding.

14. An apparatus for decoding a transport stream including one or more descriptors carrying syntax elements for an encoded plurality of layers, the apparatus comprising:
   one or more computer processors; and
   a non-transitory computer-readable storage medium comprising instructions that, when executed, control the one or more computer processors to:
      identify a first syntax element from the one or more descriptors in the transport stream to determine a respective layer parameter setting for each of the encoded plurality of layers;
      identify from the one or more descriptors at least one additional layer parameter setting for an additional layer decodable in the transport stream in addition to the encoded plurality of layers, the at least one additional layer parameter setting including a hierarchy parameter indexing a dependency between the additional layer and at least a portion of the encoded plurality of layers, wherein the at least one additional layer parameter setting is for decoding the additional layer and the at least a portion of the encoded plurality of layers; and
      decoding the at least a portion of the plurality of layers and the additional layer based on the signaled dependency.

15. The apparatus of claim 14, further comprising: decoding the transport stream to reconstruct the additional layer and the plurality of layers using the respective layer parameter settings for each of the layers.

16. The apparatus of claim 14, wherein decoding comprises: parsing the additional layer parameter setting from a transport layer for the additional layer and the at least a portion of the plurality of layers.

17. The apparatus of claim 14, wherein the instructions further comprise instructions for receiving the at least one additional layer parameter setting in a transport layer for the additional layer and the at least a portion of the plurality of layers.

18. The apparatus of claim 14, wherein the additional layer parameter setting is included in a video parameter set (VPS) or a sequence parameter set (SPS) in one of the encoded at least a portion of the plurality of layers.

19. The apparatus of claim 14 wherein the instructions further comprise instructions for using the at least one additional layer parameter setting to present elementary streams associated with the plurality of layers and the additional layer in decoding order to a decoding process.

20. The method of claim 1, wherein the layer parameter settings for the additional layer and the respective layers in the at least a portion of the plurality of layers manage individual buffer settings at the decoder for each of the additional layer and the at least a portion of the plurality of layers.

* * * * *

UNITED STATES PATENT AND TRADEMARK OFFICE
CERTIFICATE OF CORRECTION

| | | |
|---|---|---|
| PATENT NO. | : 11,350,114 B2 | |
| APPLICATION NO. | : 16/868224 | |
| DATED | : May 31, 2022 | |
| INVENTOR(S) | : Mandayam A. Narasimhan and Ajay K. Luthra | |

It is certified that error appears in the above-identified patent and that said Letters Patent is hereby corrected as shown below:

In the Specification

Column 1, Line 23: Replace "video, in" with --video. In--

Column 2, Line 20: Replace "An apparatus" with --an apparatus--

Column 6, Line 4: Replace "in future" with --in the future--

Column 9, Line 4: Replace "with describe" with --describes--

Column 10, Line 41: Replace "spatial_scallability_flag" with --spatial_scalability_flag--

Column 11, Line 19: Replace "Computer" with --computer--

Signed and Sealed this
Twenty-sixth Day of March, 2024

Katherine Kelly Vidal
*Director of the United States Patent and Trademark Office*